Dec. 2, 1952  W. KILCHENMANN  2,620,125
OSCILLATION CONTROL MEANS FOR AUTOMATIC VALVES
Filed July 3, 1945
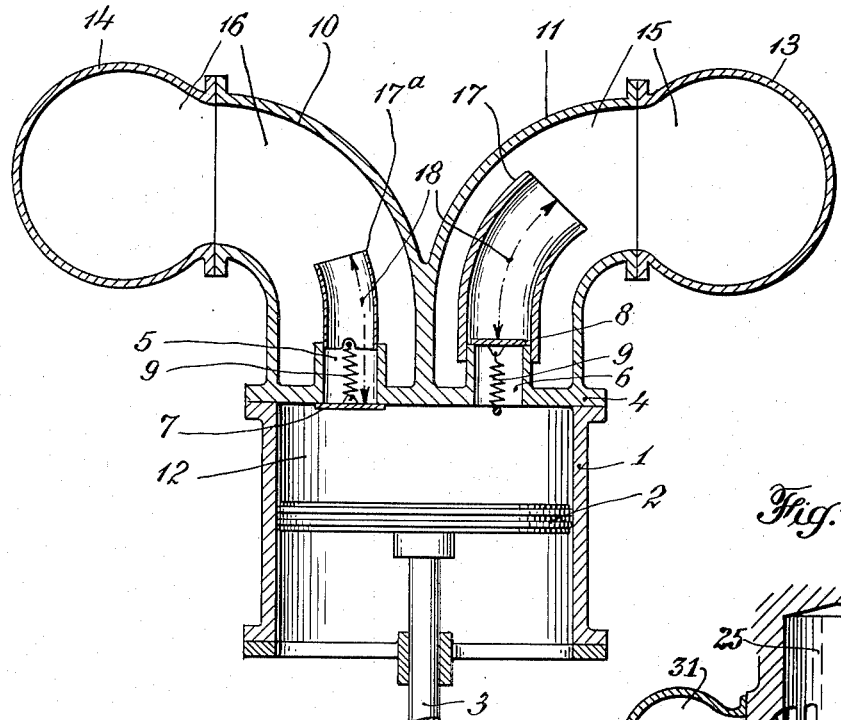
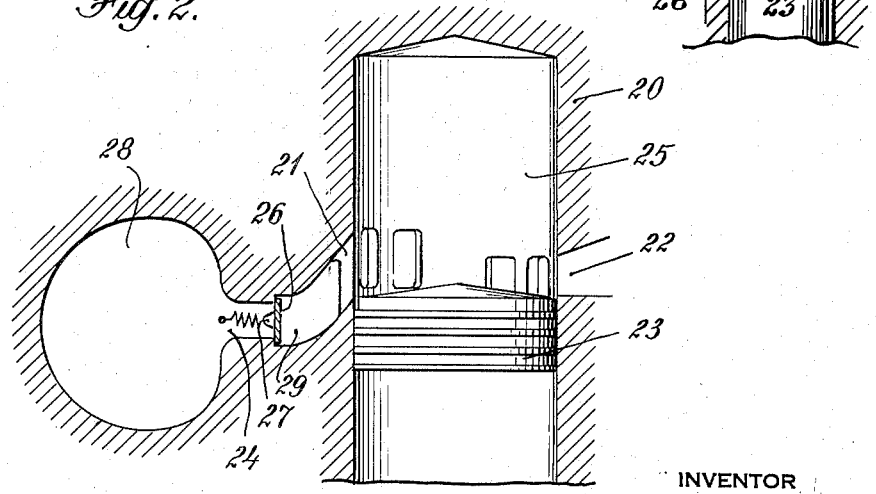
INVENTOR
WALTER KILCHENMANN
BY
ATTORNEYS Patented Dec. 2, 1952

2,620,125

UNITED STATES PATENT OFFICE 2,620,125

OSCILLATION CONTROL MEANS FOR AUTOMATIC VALVES

Walter Kilchenmann, Winterthur, Switzerland, assignor to Sulzer Freres, Societe Anonyme, Winterthur, Switzerland Application July 3, 1945, Serial No. 603,052
In Switzerland August 3, 1944

8 Claims. (Cl. 230—172)

The present invention relates to automatic valves, the opening of which is brought about by the flow or pressure of the fluid which they control, in particular in piston-type pumps. It consists in that the valve, in order to prevent an automatic cumulative development of oscillations of the valve, works in combination with an additional oscillating system whose dimensions are so chosen that it dominates all other influences taking effect from the fluid flow upon the oscillation of the valve.

In contrast to the usual meaning of the word "oscillating," in the following description the term "oscillating system" is to be understood as meaning a system which does not necessarily oscillate, but which is capable of oscillation. An oscillating system of the mechanical type consists, in its simplest purely theoretical form, of two non-elastic masses which are connected to each other by a spring without mass. Such a system would have only one natural frequency. In its more complicated forms the system would consist of several masses and several springs, which might be connected to each other in all sorts of different manners. Such a system then would have a greater number of natural frequencies.

It is, however, not actually possible to have either a non-elastic mass or a spring without mass, and consequently in an actual system of this kind, which is not a purely theoretical concept, both the masses and the elasticities are more or less uniformly distributed within the whole system. Such an actual system may then possess an infinite number of natural frequencies, but, as is also the case in a purely theoretical system, it does not need to oscillate only with these natural frequencies; any desired frequencies may be imposed upon it, or it may even remain free from oscillations.

An oscillating system of the gaseous-dynamic type is similar to the mechanical system just mentioned. Here also the mass is distributed throughout the entire system in the form of separate gas molecules; the elasticity of the gas resides between the molecules and is thus also distributed throughout the entire system. If the gas is contained in a container which communicates with a tube, the elasticity of the system derives largely from the gas content of the container since the speed of oscillation in the container is small, whilst the effective mass of the system derives largely from the gas content of the tube, the extent to which the effective mass derives from the gas content of the tube increasing as the speed of oscillation in the tube increases.

In an oscillating system of the liquid-dynamic type, a liquid takes the place of the gas and so the elasticity of the system is much reduced and its mass is much greater.

In a preferred embodiment the additional oscillating system is of the gaseous-dynamic type and consists of a pipe or passage which is mounted on the valve and whose actual length lies between approximately 0.03 and 0.20 of the wave length in the medium delivered that corresponds to the natural frequency of oscillation of the valve, it being expedient for the cross-section of the pipe or conduit to be at least about the same size as the cross-section of the opening of the valve. The pipe or conduit might be designed as a component part of the cylinder casing, of the piping carrying the fluid to and from the valve or of the valve itself. It would also be possible to design the pipe or conduit as an independent structure.

In automatic valves, the opening of which is brought about by the flow or pressure of the fluid which they control, in particular those in piston-type pumps for delivering compressible fluids, experience has shown that in certain circumstances oscillations occur which disturb service by causing noise and which in many cases lead to increased wear, damage to and even fracture of the valves oscillating in this way. It is the purpose of the present invention to avoid these disadvantages.

Several elements participate in producing automatic oscillation of such valves. The flow of fluid delivered through the valves, for instance a flow of gas, is to be regarded as one of these. It holds the valve open and thus makes it capable of oscillation. It further produces at the valve a gas velocity and a drop of pressure, whereby a reservoir of power is created from which the valve is able to obtain the power necessary for its oscillation.

A further element which has to be considered is the valve itself, which in an open state represents a system capable of oscillation and which in a state of oscillation periodically forces a certain quantity of gas forwards and backwards and furthermore periodically increases and reduces the distance between it and its seat. In this way two different components of oscillation, which are relatively displaced in time, are imposed on the gas velocity prevailing in the passages of the valve. The former of these two components further depends on the frequency, and the second on the oscillation of the pressure drop in the valve. The latter is caused by the gas system coming in contact with the valve on one or both sides. The oscillation of the pressure drop also acts with alternating forces on the valve, and in this way influences the oscillation of the valve, so that the cycle of cause and effect is complete.

Three further pulsating forces also take effect on the oscillating valve, namely the weight of the valve, the damping force and the spring force which presses the valve against its seat. These forces and the reciprocating forces generated by the oscillation of the pressure drop are displaced in time both relatively to each other and also relatively to the oscillation of the gas velocity and in part also to the oscillation of the lift of the valve.

The gas system before and after the valve takes part as a third element in producing the automatic oscillation of the valve.

In the delivery valve of the scavenging pump of a two-stroke engine, for instance, the preceding gas system consists of the swept space in the pump cylinder, the dead space and the connecting passage reaching to the delivery valve. The following gas system consists of the scavenging passages of the engine and the connecting pipe leading to these from the delivery valve. These two gas systems cause the oscillations of the pressure drop already mentioned.

The oscillation of the gas velocity in the valve passages emits waves forwards and backwards which are reflected somewhere in the gas systems and which thereupon, damped in different ways, return to the valve at different times. In doing so, they interfere with the waves later emitted from the valve and produce with them resultant oscillations, the oscillations of velocity close before and close after the valve being equal for reasons of continuity, while the pressure oscillations differ from each other, the difference being the oscillation of the pressure drop mentioned. Under these circumstances and in view of the other given factors of design, it would scarcely be possible in practice to attune these various elements and their complicated relationships to each other by the design and structure of the aggregate and by suitable arrangement of the single parts in such a way that the resulting total effect excludes the possibility, within a given range of service, of any oscillation of automatic valves, the opening of which is brought about by the flow or pressure of the fluid which they control in piston-type pumps. This task is made completely impossible, however, by the fact, not considered above, that the preceding system is not at all constant, but changes its size and form to a considerable extent during a revolution of the engine as a consequence of the reciprocating motion of the scavenging pump piston, and that in multi-cylinder engines the same holds good also for the following gas system, as first the one and then the other scavenging pump delivers into the scavenging passages and the scavenging ports also open in alternating succession. These difficulties and impossibilities are now obviated according to the proposal of the invention by providing an additional oscillating system which, when suitably dimensioned, dominates the influences acting from the fluid flow upon the oscillation of the valve and is for its part so chosen that the resulting total effect excludes all oscillations.

This additional dominating oscillating system may in itself be of mechanical, gaseous-dynamic or fluid-dynamic nature and may be provided parallel to, alongside, in series with, or in combination with the other oscillating systems. In the exemplifications of the invention described below and shown on the attached drawing a gaseous-dynamic oscillating system, arranged in series, is chosen.

Fig. 1 shows a scavenging pump in section;

Fig. 2 shows a scavenging device in a reciprocating engine in longitudinal section; and Fig. 3 shows a modified form of the device illustrated in Fig. 2.

The scavenging pump shown in Fig. 1 has a pump cylinder 1, in which is provided the piston 2 actuated through a piston rod 3. In the cylinder cover 4 there are arranged an admission opening 5 and an outlet opening 6 which are covered by the disc valves 7 and 8 automatically controlled by the fluid flow. The valves 7, 8 are pressed against their seats by tensile springs 9. On the cylinder cover 4 are provided a suction branch 10 and a delivery branch 11 which communicate through the open suction valve 7 or delivery valve 8 with the swept space 12, which varies in consequence of the movement of the piston 2. The delivery branch 11 is connected to a pressure receiver 13 and the suction branch to the suction pipe 14, the spaces 15 and 16 occupied by the fluid flow comprising the gas system before and after the valves. On the openings 5 and 6 of the valves 7 and 8 are mounted the pipes 17a and 17 respectively projecting into the suction and delivery branches 10 and 11. The length 18 of the conduits 17a and 17 amounts to approximately 0.10 of the wave length which corresponds to the natural frequency of oscillation of the valve surrounded by the fluid flow and consisting of the valve disc 7 or 8 and the spring 9 in each case.

A pipe designed and arranged in this way and acting as a dominating oscillating system is qualified to protect the valve from all influences which might excite oscillation in the valve surrounded by the fluid flow, and to do this under all working conditions occurring in practice, i. e. at all positions of the piston presenting themselves and at the most widely varying working speeds. If for instance the wave length of the natural oscillation of the valves 7 and 8 with the springs were determined as being 450 cm., it is sufficient, in order to prevent the valve from oscillating during service, to mount a pipe 45 cm. in length on the valve, it being particularly favourable for the effect required if the greatest cross-section of the conduit 17 or 17a is not very much greater than that of the openings 6 and 5.

The reciprocating internal combustion engine shown in Fig. 2 has a working cylinder casing 20 which is equipped with scavenging and extra-charging ports 21 and with exhaust ports 22. The ports 21, 22 are controlled by the working piston 23. The scavenging-air receiver communicates through the passages 24, 29 and the ports 21 with the cylinder working space 25. The passage 24 is provided with a non-return valve 26 which is pressed on its seat by a spring 27. The length of the passage 24 amounts to approximately 0.10 of the wave length corresponding to the natural frequency of oscillation of the valve 26 with the spring 27. During the scavenging and extra-charging phase, when the working piston 3 is thus in the neighbourhood of its outer dead centre and a pressure prevails in the receiver 28 which is greater than the pressure in the cylinder working space 25, the valve 26 will be opened by this greater pressure in opposition to the force of the spring 27, whereby scavenging air flows out of the receiver 28 through the passage 24 and the ports 21 into the cylinder working space 25 and drives the combustion gases out of the ports 22. The length of the passage 24 given is qualified to keep all influences exciting oscillation away from the open valve 26, thus dominating these influences, so that the open valve 26 makes no oscillating movements apart from the movements resulting from the pressure difference in the scavenging air receiver 28 and the cylinder working space 25 and from the force of the spring 27.

In speaking of lengths or distances herein, where dimensions are not given in terms of linear units of measurement, but rather in terms of wave length, as will be well understood by those skilled in the art, "acoustic length" rather than "material length" is intended. An expression of the acoustic length states how many wave lengths are contained in the passage rather than a material length of the passage obtained by mere transposition of those wave lengths into linear units. To translate acoustic length into material length one must take into account, of course, the Rayleigh correction and also the effect of resonance. Likewise in determining the natural frequency of a tube the Rayleigh correction and the effect of resonance must be considered. Thus an open end tube associated with a valve according to the invention and functioning as a resonator may possess the same natural frequency as the valve and yet contain only one-quarter of a wave length corresponding to that frequency. The acoustic length of such a passage would be equal to 0.25 of the wave length corresponding to the wave length of the natural frequency of the valve and its material length would depend upon the application of the Rayleigh correction.

The automatic valve, the opening of which is brought about by the flow or pressure of the fluid which it controls, may be designed as a disc valve, an annular valve, a leaf-spring valve or the like. The medium delivered may be a compressible gaseous or substantially incompressibly liquid medium, for instance air, ammonia vapour, water or the like. According to the exigencies of a particular construction the conduit 29 following the valve 26 may be designed as the dominating oscillating structure instead of the conduit 24.

Instead of the conduit 24 which comprises the additional dominating oscillating system being an integral part of the general fluid flow system as illustrated in Fig. 2, a reciprocating internal combustion engine similar to that of Fig. 2, may, as shown in Fig. 3, embody the additional dominating oscillating system in a separate and wholly ancillary conduit forming member 30, protruding member 30, protruding for instance into the general volume of the scavenging air manifold 31, and by which the valve 26 and its controlling spring 27 is carried.

I claim:

1. In fluid flow apparatus, the improvement in automatic valves the opening of which is brought about by the flow or pressure of the fluid they control which includes, in combination with such a valve, a conduit for the fluid passing said valve, said conduit having restricted cross-section and length in relation to the flow apparatus as a whole, one end of said conduit adjoining said valve and the other end separated therefrom by a distance which amounts to at least 0.03 and at most 0.20 of the wave length in said fluid that corresponds to the natural oscillation frequency of said valve when not so combined.

2. The improvement of claim 1 in which the cross-section of the conduit has substantially the same area as the opening of the valve.

3. The improvement of claim 1 which includes, in combination with the valve, a piston-type machine having a cylinder casing, the conduit being formed as an integral part of said cylinder casing.

4. The improvement of claim 1 which includes piping leading the fluid to and from the valve, the conduit being formed as a component part of said piping.

5. The improvement of claim 1 which includes piping leading the fluid to and from the valve, the conduit being formed as a separate structure independent of said piping.

6. The improvement of claim 1 which includes a spring controlling the valve, the conduit, said valve and said spring being formed as a unit assembly.

7. In fluid flow apparatus, in combination, an automatic valve the opening of which is brought about by the flow or pressure of the fluid it controls and oscillation control means associated with said valve comprising a mass-and-elasticity system capable of oscillation, said system having a natural oscillation frequency not less than 1.25 times and not more than 8.33 . . . times the natural oscillation frequency of said valve and being so dimensioned and arranged that it dominates all other influences of said fluid which tend to provoke oscillations of said valve and excludes the possibility of oscillations of said valve arising from said influences or from the influence of said system itself.

8. The combination of claim 7 in which the mass-and-elasticity system is of the gaseous-dynamic type.

WALTER KILCHENMANN.

REFERENCES CITED

The following references are of record in the file of this patent:

UNITED STATES PATENTS

| Number | Name | Date |
| --- | --- | --- |
| 1,253,535 | Rosenfield | Jan. 15, 1918 |
| 1,818,375 | Bourne | Aug. 11, 1931 |
| 2,198,021 | Wood | Apr. 23, 1940 |
| 2,405,100 | Stephens | July 30, 1946 |

FOREIGN PATENTS

| Number | Country | Date |
| --- | --- | --- |
| 451,193 | Great Britain | July 31, 1936 |
| 555,944 | Great Britain | Sept 14, 1943 |
| 625,091 | Great Britain | June 22, 1949 |